US011686349B2

(12) United States Patent
Beattie et al.

(10) Patent No.: US 11,686,349 B2
(45) Date of Patent: Jun. 27, 2023

(54) SELF-ALIGNING SEAL ASSEMBLY

(71) Applicant: DASH ENGINEERING PTY LTD, Midland (AU)

(72) Inventors: David Beattie, Chidlow (AU); Alan Paul Bampton, Frankston (AU); Jim Kendrick, Ferndale (AU)

(73) Assignee: DASH ENGINEERING PTY LTD, Midland (AU)

( * ) Notice: Subject to any disclaimer, the term of this patent is extended or adjusted under 35 U.S.C. 154(b) by 167 days.

(21) Appl. No.: 17/277,324

(22) PCT Filed: Sep. 21, 2018

(86) PCT No.: PCT/AU2018/051045
§ 371 (c)(1),
(2) Date: Mar. 18, 2021

(87) PCT Pub. No.: WO2019/183661
PCT Pub. Date: Oct. 3, 2019

(65) Prior Publication Data
US 2021/0348652 A1        Nov. 11, 2021

(51) Int. Cl.
*F16C 33/66*        (2006.01)
*F16C 33/78*        (2006.01)
(Continued)

(52) U.S. Cl.
CPC ........ *F16C 33/6655* (2013.01); *F16C 33/782* (2013.01); *F16J 15/3248* (2013.01); *F16J 15/3268* (2013.01); *F16J 15/54* (2013.01)

(58) Field of Classification Search
CPC .... F16J 15/00; F16J 15/16; F16J 15/50; F16J 15/52; F16J 15/3248; F16J 15/3256;
(Continued)

(56) References Cited

U.S. PATENT DOCUMENTS 3,717,392 A * 2/1973 Ennis ..................... B23Q 1/385
                                                                    384/111
3,847,453 A * 11/1974 Herbert ................ F16J 15/3268
                                                                    277/916
(Continued)

FOREIGN PATENT DOCUMENTS

CN        104141793 B        10/2016
JP        2005238114 A   *    9/2005
WO        2009/008467 A1      1/2009

*Primary Examiner* — Nathan Cumar
(74) *Attorney, Agent, or Firm* — Thomas M. Joseph

(57) ABSTRACT

A seal assembly (10, 110) has an inner seal carrier (14, 114) with seals (16, 116, 18, 118), an outer carrier (30, 130) with inner curved surface (144) matching an outer curved surface (146) of the inner seal carrier for angular pitch adjustment of 3° to 5° for the inner seal carrier within the outer carrier, a flexible seal (36, 136) between the outer carrier and the bearing housing (28, 128), and oil within a cavity (20, 120) between the seals, preferably above atmospheric pressure. Shoulder bolts (140) allow lateral movement of the seal assembly with respect to the bearing housing. The seal assembly allows for misalignment and lack of parallelism of the shaft relative to the bearing housing whilst preventing contamination of the bearing.

20 Claims, 5 Drawing Sheets

(51) Int. Cl.
*F16J 15/3268* (2016.01)
*F16J 15/54* (2006.01)
*F16J 15/3248* (2016.01)

(58) Field of Classification Search
CPC .. F16J 15/3264; F16J 15/3268; F16J 15/3272; F16J 15/3276; F16J 15/54; F16C 33/00; F16C 33/6637; F16C 33/664; F16C 33/6655; F16C 33/78; F16C 33/7816; F16C 33/782; F16C 33/7823; F16C 33/7826
USPC .......................................................... 277/506
See application file for complete search history.

(56) References Cited

U.S. PATENT DOCUMENTS

| | | | |
|---|---|---|---|
| 4,480,842 A | 11/1984 | Mahyera et al. | |
| 2009/0194950 A1 | 8/2009 | Orlowski et al. | |
| 2015/0345643 A1* | 12/2015 | Hoehle | F16J 15/187 277/413 |
| 2016/0312898 A1* | 10/2016 | Shah | F16J 15/3472 |

* cited by examiner

DETAIL D

US 11,686,349 B2

SELF-ALIGNING SEAL ASSEMBLY

CROSS REFERENCE TO RELATED APPLICATIONS

The present application is a U.S. national stage application of PCT International Application No. PCT/AU2018/051045, filed on Sep. 21, 2018, and published as PCT Publication WO/2019/183661 on Mar. 10, 2019. The disclosure of the foregoing application is hereby incorporated by reference in its entirety into the present application.

FIELD OF THE INVENTION

The present invention relates to a self-aligning seal assembly.

The present invention finds particular application as a self-aligning seal assembly for use in preventing contamination of bearings, such as but not limited to, bearings for conveyor rollers.

BACKGROUND TO THE INVENTION

Current sealing systems for bearings often use grease as the sealing medium. This grease has a tendency to become contaminated by surrounding dust and abrasive material eventually contaminating the bearing lubricant within the housing.

A known methodology for minimising this ingress is to utilise a labyrinth that is filled with grease to mitigate the contamination compromising the seal and bearing that the seal is protecting.

The concept is that the labyrinth grooves (a long continuous path) and the grease reduce the opportunity for contamination to reach the bearing. In reality, contamination gradually permeates the grease and eventually affects the bearing.

Due to the misalignment requirements, the labyrinth grooves of the labyrinth seals have a significant clearance that the grease must fill in order to stop the ingress of contamination. This contamination usually comprises of:

Fine dust/abrasive material (usually from the product being conveyed by the conveyor);

Water (such as from external sources such as high pressure washing and exposure to the environment e.g. rain)

Such known seals are known to have problems maintaining an adequate seal against ingress of contamination even with the installation of automated greasing lines.

Bearing failure analysis on numerous pulley failures clearly indicates the grease does not act as an effective barrier against such contamination, but the grease can be a carrier of contamination into the bearing.

Any dust or other contaminant that contacts the grease lubricant that is used to seal these known labyrinth seal has a tendency to become 'mixed' due to rotation in such assemblies.

This mixing results in the labyrinth sealing medium becoming contaminated which then enters the bearing housing cavity.

Some conventional seals used to seal bearings from contamination require oil from the components being lubricated to lubricate the seal lip face or shaft damage will result.

It is with the aforementioned in mind that the present invention has been realised.

It has been found desirable to provide a seal assembly that mitigates against contamination of a component, such as a bearing e.g. bearings for conveyor rollers, electric motors, gearboxes, railway traction motors and axle boxes, pumps, crushers, screens.

SUMMARY OF THE INVENTION

An aspect of the present invention provides a seal assembly for a rotatable shaft supported by a bearing in a bearing housing, the seal assembly including an inner seal carrier supporting seals for engagement with the shaft, the outer carrier supporting the inner seal carrier and having an inner curved surface, the inner seal carrier having an outer curved surface allowing angular positional adjustment of the inner seal carrier within the outer carrier, and the seal assembly including oil within a cavity between the seals.

Preferably the oil is within the cavity at a pressure at or above atmospheric pressure at the location of the seal assembly.

The oil within the cavity may be pressurised above atmospheric pressure.

Preferably the oil is at a pressure between atmospheric and 1.0 bar (100 kPa).

More preferably the oil is at a pressure of a minimum 0.1 Bar (10 kPa) above atmospheric pressure.

More preferably the oil is at a pressure between 0.1 bar (10 kPa) and 0.8 bar (80 kPa). Yet more preferably the oil is at a pressure between 0.1 bar (10 kPa) and 0.5 bar (50 kPa).

The inner seal carrier may have at least one oil hole for filling oil and/or purging air from the cavity between the seals in the inner seal carrier.

The at least one oil hole for may be plugged by at least one corresponding sealing means, such as a sealing plug (e.g. a grub screw or valve), which may self seal in the respective oil hole or seal by addition of a sealing agent, such as a polymer tape or may seal by application of a thread sealing liquid.

As mentioned above, the at least one oil hole may be sealed by a respective valve that retains pressure within the cavity but can be opened when pressure is applied externally to apply/replenish oil into the cavity.

A flexible seal may be provided to seal the sealing assembly to a housing of the bearing.

The outer carrier may include holes allowing the seal assembly to be sufficiently fastened to a face of the housing whilst allowing movement of the seal assembly for maintaining alignment with the shaft with the flexible seal maintaining sealing between the outer carrier and the housing.

The holes may be oversized with respect to diameter of bolts used to fasten the outer carrier to the bearing housing.

The bolts may include shoulder bolts. The shoulder bolts may include a head for receiving a fastener tool (such as a drive key, a ratchet or spanner), an plain intermediate shaft portion and a distal threaded portion. A shoulder may be provided at the interface between the plain intermediate shaft portion (shank) and the threaded portion, thereby providing a limited depth of engagement of the shoulder bolt when the shoulder engages with a surface, such as a surface of the bearing housing. This ensures a minimum plain intermediate shaft portion (shank) length extending from the bearing housing whilst allowing the shoulder bolts to sufficiently compress the flexible seal between the outer carrier and the bearing housing by the underside of the head of each respective bolt applying pressure to the outer carrier.

Preferably, there is a 1-3 mm radial gap between the outer surface of the shaft of the bolt (such as the intermediate shaft portion of the bolt) and the internal bore of the respective hole. Consequently, there can be 2-6 mm of sideways/lateral movement (β) along the interface between the bearing housing and seal assembly. Such sideways/lateral freeplay for the freedom of movement vertically and horizontally and diagonally (β) i.e. lateral movement with respect to the seal assembly mounting to the bearing housing.

The flexible seal can be provided from a range of thickness choices of said flexible seals. That is, a range of different thickness flexible seals may be provided to allow a user to select the suitable flexible seal for the seal assembly and bearing housing in situ. Flexible seal thicknesses can range from 0.01 mm to 5 mm, preferably 0.1 mm to 2 mm, more preferably 0.5 mm to 1.0 mm.

Some examples of applications with rotating shafts that require seals for bearing lubricant cleanliness to be maintained are:

Conveyor Pulleys, Electric motors, Gearboxes, Railway traction motors and axle boxes, Pumps, Crushers, Screens The inner seal carrier may include at least one inner seal carrier seal. The at least one inner seal carrier seal may include two or more spaced seals parallel to one another around a periphery of the inner seal carrier.

The at least one inner seal carrier seal may be provided on the curved outer surface of the inner seal carrier, preferably towards an outer face of the inner seal carrier (the opposed inner face of the inner seal carrier being towards the bearing housing when installed).

The cavity may provide a reservoir of oil to help maintain sufficient supply of oil to lubricate the seals and/or to help maintain sufficient positive pressure of oil within the seal assembly.

Positive oil pressure and/or hydraulic lock of the oil within the cavity may help to support the seals from inward collapse/external pressure.

The inner seal carrier may have up to +/−5° angular freedom (Q) with respect to the centre of axis of rotation of the shaft within the outer carrier to accommodate for (lack of) parallelism with respect to the shaft. That is, the inner seal carrier may allow the seals to remain in contact with the shaft by the inner seal carrier rotating within the outer carrier such that the part of the inner seal carrier rotates towards interface between the seal assembly and the bearing housing whilst another part of the inner seal carrier rotates toward an outer face of the seal assembly.

Preferably the angular freedom (Q) of the inner seal carrier is +/−4°, more preferably +/−3°.

The seal assembly may include a space between the inner seal carrier and the bearing housing allowing the inner seal carrier to pitch about the centreline of the shaft by up to a few angular degrees without hitting the front face of the bearing housing or the flexible seal.

The inner seal carrier may include a support for the seals and which extending inwardly towards the shaft and between the seals. Preferably the support is T shaped in cross section, at least in one portion thereof.

The support for the seals may be or include an annular component that fits within the inner seal carrier. Alternatively, the support may be machined/formed as an integral part of the inner seal carrier. The 'T' section may be an insert into a ring or may be machined or formed into the inner seal carrier.

The support for the seals may include one or more apertures therethrough for oil flow/oil pressure balance between the seals.

Preferably the support supports the seals when the angular adjustment (pitch) of the inner seal carrier relative to the outer carrier is at or beyond a threshold. The threshold may be at or greater than the allowed pitch angle α of between 3°-5°.

With the inner seal carrier being annular, the angular or pitch movement of the inner seal carrier (and therefore of the seals) about the shaft compensates for what would otherwise be misalignment in parallelism of the seals and the shaft, thereby maintaining sealing because the seals and the inner seal carrier position for alignment and sealing about the shaft relative to the outer carrier and the bearing housing.

The curved outer surface of the inner seal carrier and the curved inner surface of the outer carrier match each other in radial curvature such that the inner seal carrier can pitch angularly within and relative to the outer carrier.

The curved inner surface of the outer carrier and the curved outer surface of the inner seal carrier have compound curvature, being curved annularly and in cross section front to rear. The front to rear curvature allows for the angular adjustment for parallelism with the shaft.

The lateral positional adjustability of the seal assembly relative to the bearing housing is provided by the oversized holes through the outer carrier allowing for vertical, horizontal and diagonal adjustment.

It will be appreciated that, with the oversized holes (with respect to the diameter of the shank of the bolts to be used to fasten the seal assembly to the bearing housing through the outer carrier) arranged spaced in a circle allow for lateral movement of the seal assembly when the bolts are in place (as represented by the directional arrows and symbol β in the accompanying figures for ease of understanding). Because the shanks of the bolts are preferably circular and the holes are preferably circular, the lateral movement can be in any direction (up, down, sideways, diagonally) by a few millimetres. Forward and rearward pitch adjustment of the inner seal carrier and accompanying seals is accommodated by the curved interface between the inner seal carrier and outer carrier.

DESCRIPTION OF PREFERRED EMBODIMENT

Figure 1:
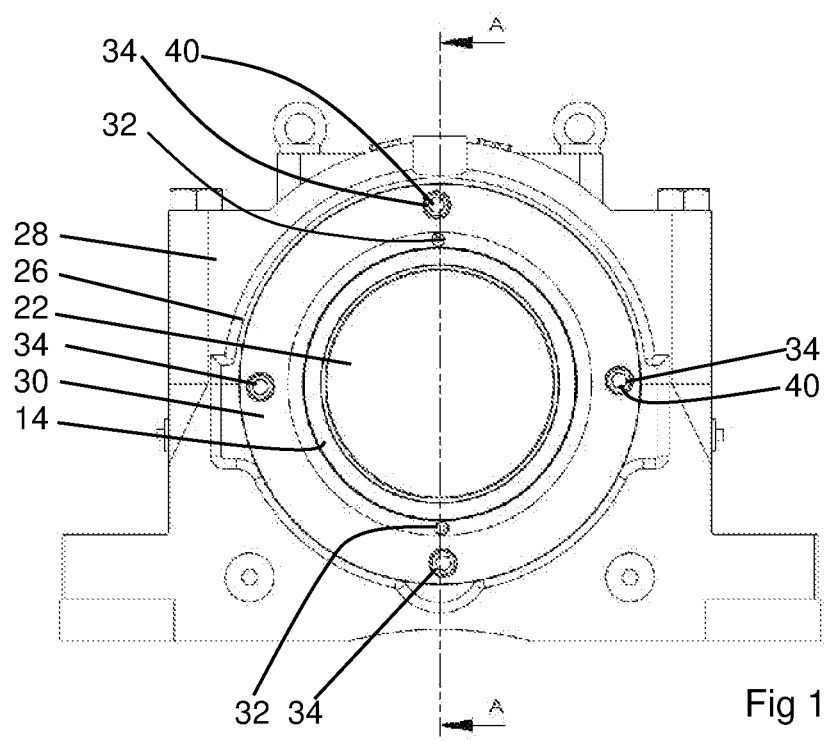
FIG. 1 shows a front view of a seal assembly according to an embodiment of the present invention mounted to a bearing housing.

A seal assembly 10 of the present invention has two key components: A seal carrier 12 and a pressurised oil sealing medium 14.

The seal carrier 12 locates, in use, two contact lip style oil seals 16, 18.

The cavity 20 between the two oil seals 16, 18 is filled with oil that is maintained under pressure.

The seal carrier 12 is alignable relative to a shaft 22 in order to maintain a positive seal with respect to the shaft 22, the shaft supported by a bearing 24 protected from contamination by the seal assembly 10.

The seal carrier 12 fulfils requirements to maintain a positive seal with respect the shaft 22. These requirements are:

Misalignment in three (3) axes—vertical, horizontal and radial

Parallelism with the shaft

The seal must accommodate these various (3 axes) misalignments whilst maintaining parallelism with the shaft.

The self-aligning pressurised oil seal embodying the present invention utilises pressurised oil as the sealing medium. It has the capacity to maintain parallel alignment with the shaft when the housing that it is mounted on is misaligned radially, vertically and horizontally.

The seal carrier of the seal assembly has the ability to misalign on a housing face 26 of a bearing housing 28 horizontally and vertically as well as maintaining parallelism with the shaft 22. The seal carrier includes an inner seal carrier 14 and an outer carrier 30. The inner seal carrier can adjust alignment radially within the outer carrier 30.

As shown in the embodiment in FIG. 1, the seal assembly 10 has three primary components:

1. An outer carrier 30, such as arranged to mount to a housing face 26 of a bearing housing 28;
2. An inner seal carrier 14;
3. Oil Seals 16, 18

Holes 32 within the inner seal carrier 14 allow for oil filling and air purging. The holes are required for:

1. filling the void/cavity 20 between seals 16, 18;
2. purging air from the void/cavity 20;
3. attaching pressurised oil source to pressurise the oil within the void.

Figure 2:
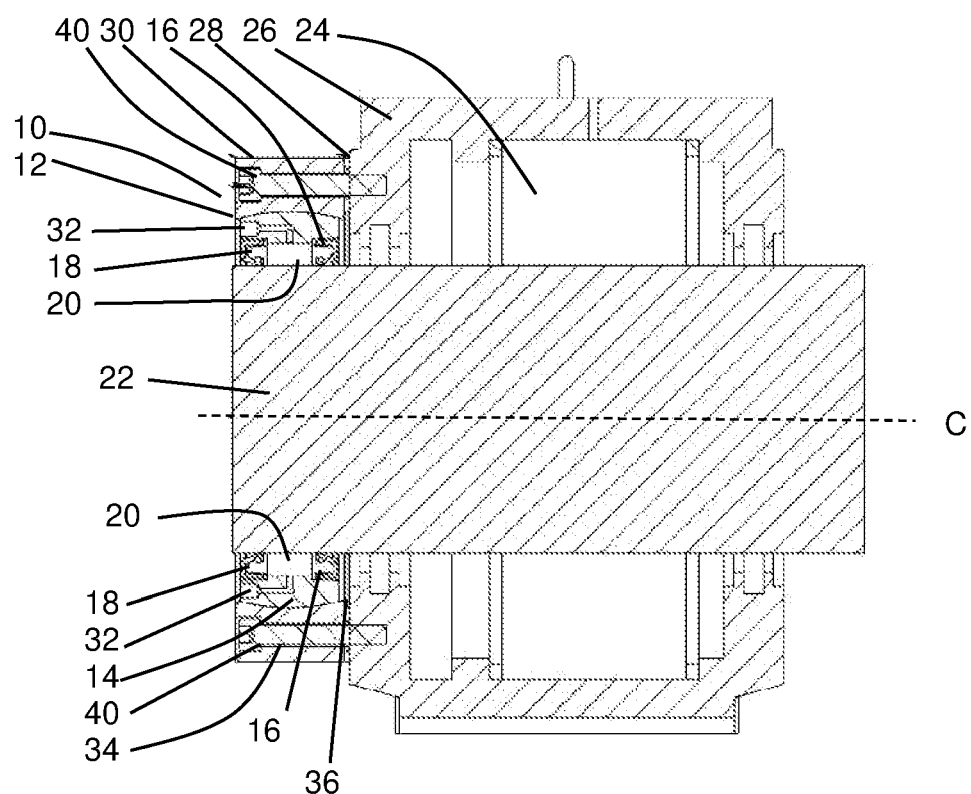
FIG. 2 shows a cross sectional view (A-A in FIG. 1) of the seal assembly of FIG. 1 mounted to the aforementioned bearing housing.

FIG. 2 shows a cross sectional view A-A through the bearing housing, bearing, shaft and seal assembly shown in FIG. 1.

During operation, the shaft 22 may not maintain parallelism with the housing 28 and so the entire seal assembly 10 is able to move with respect to the housing (vertically and horizontally).

Furthermore, the shaft 22 can axially misalign about the centre line C of the bearing 24.

To maintain seal parallelism with respect to the shaft 22 during this misalignment, the alignable inner seal carrier 14 moves within the outer carrier 30.

The seal assembly 10 is sealed to the housing 28 with a flexible seal 36. The flexible seal 36 allows for the relative movement between the bearing housing 28 and the seal assembly 10 and resists contamination ingress at the interface between the bearing housing 28 and the seal assembly 10.

To allow for the relative movement of the seal assembly and bearing housing, mounting holes 34 for the mounting bolts 40 are machined oversized.

The bolts are tightened (or spaced) to allow for adequate sealing force between the bearing housing and the seal assembly.

Operation—Sealing Medium: For the seal assembly in use, the oil seal cavity 20 is filled with an oil. The viscosity grade of the oil can vary depending upon the application for the seal assembly 10.

The oil within the cavity is pressurised to a minimum 0.5 Bar (50 kPa) above atmospheric pressure. Any material attempting to breach the seal will be forced out along with a small quantity of oil. This oil pressure will vary depending on the application.

The seal assembly utilises its own oil reservoir to maintain pressure whilst lubricating lip faces of the seals sealing the shaft. Depending on the application, this oil pressure could also be sourced from the equipment using the oil.

The present invention utilises pressurised oil between the oil seals 16, 18 to maintain a contamination barrier from the item requiring sealing on a rotatable shaft.

Figure 3:
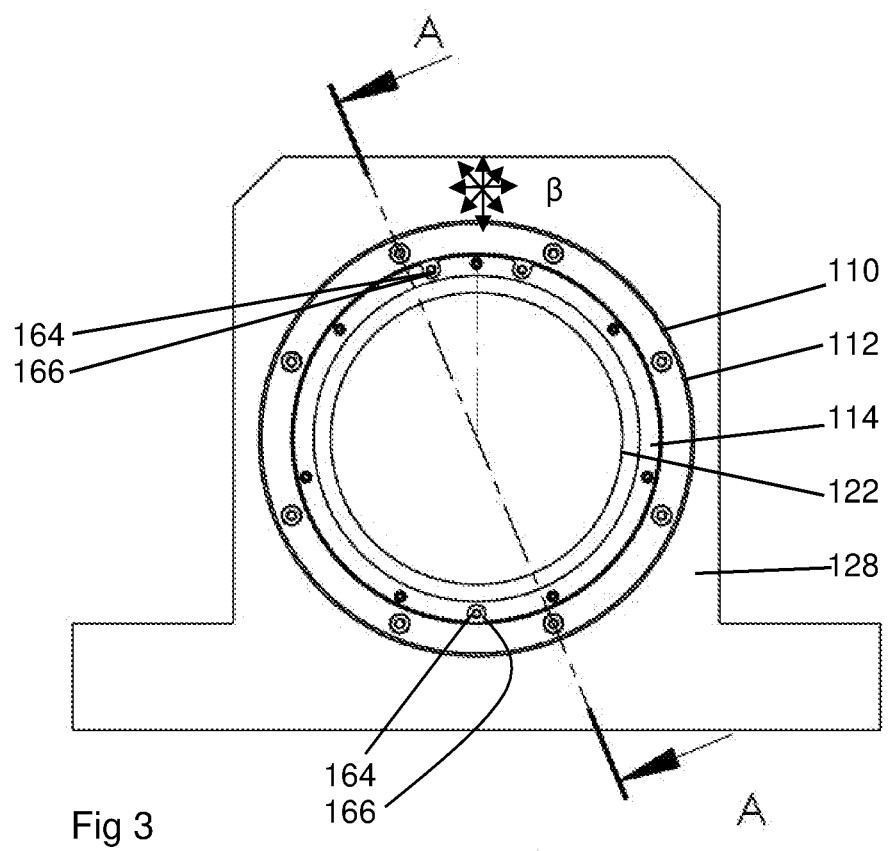
FIG. 3 shows a front view of a seal assembly according to an alternative embodiment of the present invention mounted to a bearing housing.
Figure 4:
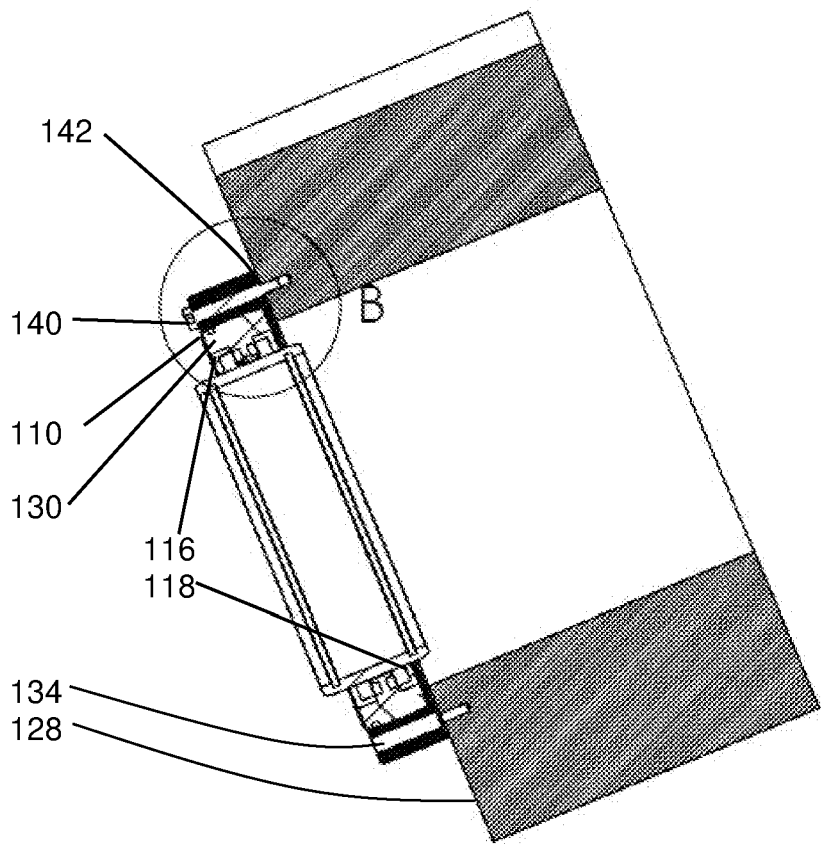
FIG. 4 shows a cross sectional view along A-A in FIG. 3.
Figure 5:
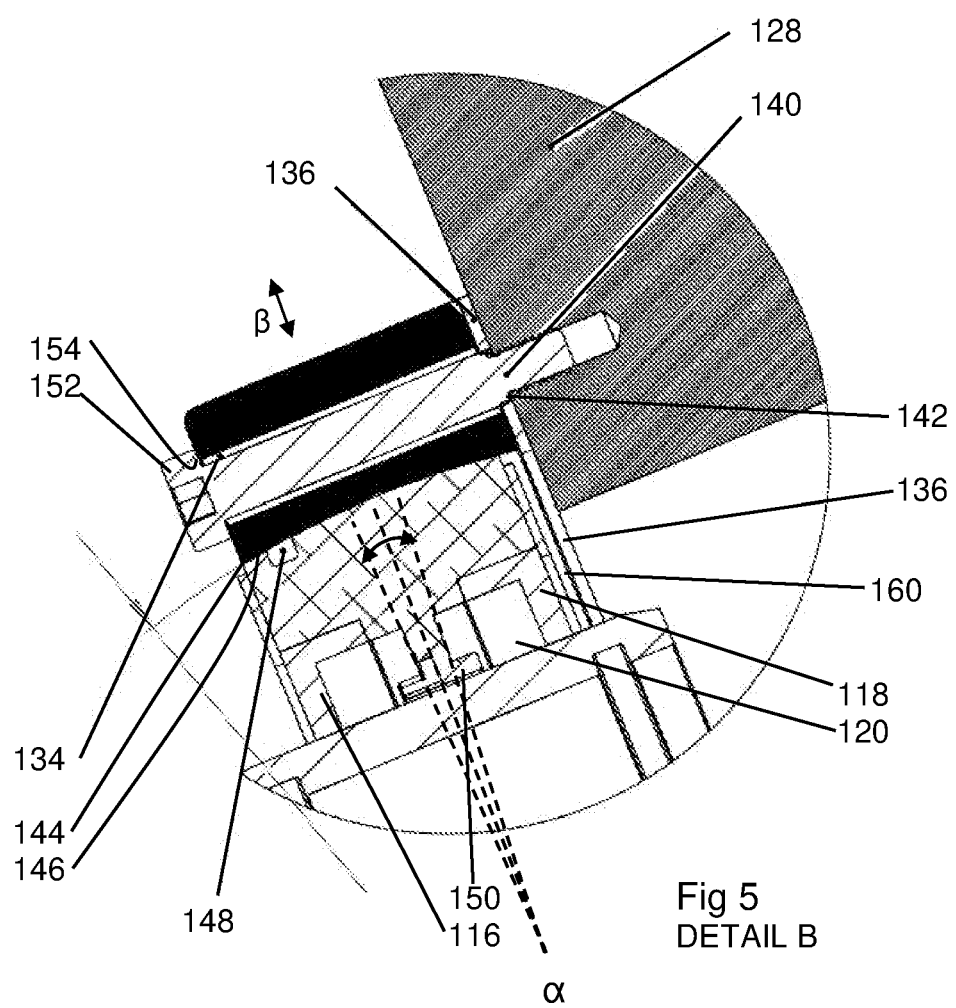
FIG. 5 shows detail B identified in FIG. 4.
Figure 6:
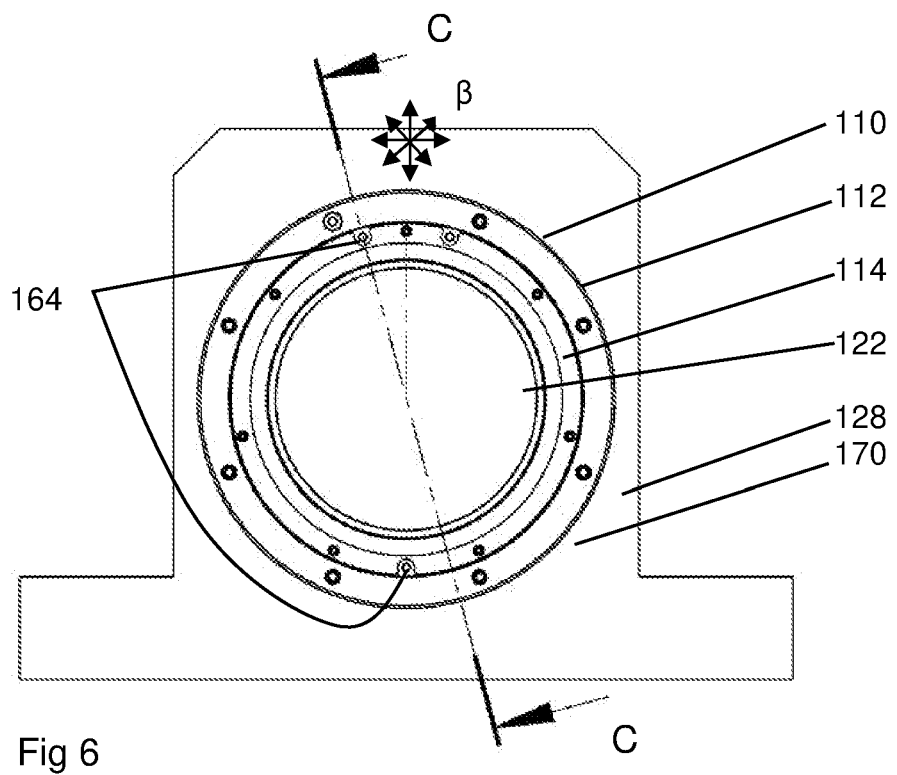
FIG. 6 shows a front view of a seal assembly according to an alternative embodiment of the present invention mounted to a bearing housing.
Figure 7:
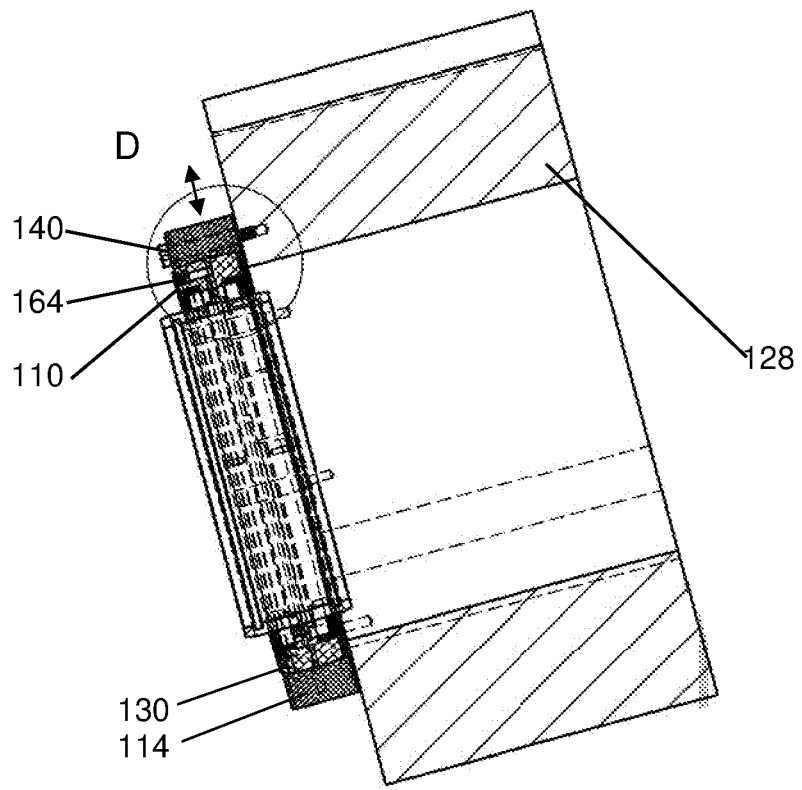
FIG. 7 shows a cross sectional view along C-C in FIG. 6.
Figure 8:
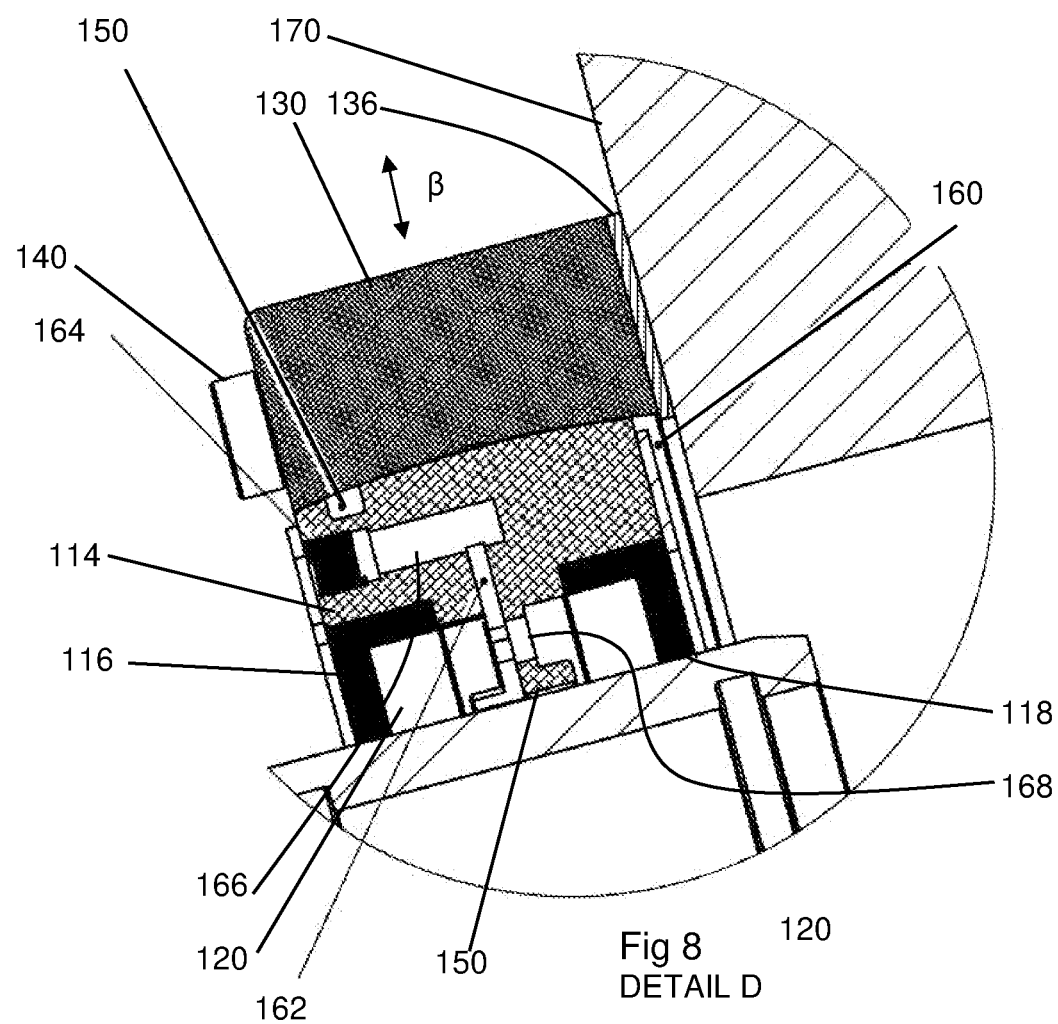
FIG. 8 shows detail D identified in FIG. 7.

As shown in FIGS. 3 to 5, a seal assembly 110 includes a seal carrier 112 including an inner carrier 114.

The inner seal carrier supports therein at least two seals 116, 118 which respectively contact a shaft 122.

The inner seal carrier is retained within an outer carrier 130.

Holes 134 can be oversized in their diameter/bore with respect to bolts 140. This provides for a constrained amount of lateral freedom (13) of the seal assembly with respect to the bearing housing. For example, the seal assembly can move upwards or sideways (i.e. laterally) across the face of the bearing housing.

The inner seal carrier can angularly adjust in pitch by an angular amount of degrees (a) with respect to the centreline of the shaft to accommodate a misalignment in parallelism of the shaft with respect to the outer carrier and/or bearing housing.

It will be appreciated that, as one portion of the inner seal carrier adjusts towards the bearing housing (reducing the clearance between the bearing housing and the inner seal carrier) another (opposite) portion of the annular inner seal carrier moves away from the bearing housing.

The bolts 140 are preferably shoulder bolts providing limited fastening depth into the bearing housing due to the shoulder 142.

The inner surface 144 of the outer carrier and the outer surface 146 of the inner seal carrier outer surface can have matching curvature with respect to the centre of axis of rotation of the shaft, such as matching radius of curvature.

An interface seal 148 (such as a circle or rectilinear cross section O-ring seal) can be provided on the outer surface of the inner seal carrier to interface seal against contamination between the inner seal carrier and the outer carrier. The interface seal acts to wipe clean the inner surface of the outer carrier when angular adjustment occurs and prevent contamination (dirt, dust and water) ingressing into the seal between the inner and outer surfaces 144, 146 of the respective carriers.

A support 150 is provided within the inner seal carrier 114. The support can support the seals 116, 118. The support 150 may be provided as a spine extending around the internal periphery of the inner seal carrier. The seal assembly according to one or more forms of the present invention can adjust/accommodate for misalignment between the seals and the shaft but only to a limit of the angular adjustment and lateral adjustment. The support 150 (such as an inner spine) prevents excessive load and excessive misalignment angle of the seals 116, 118 (such as lip seals) and thus prevents failure of the seal assembly from excessive adjustment.

A head 152 of the bolt 140 can include a head shoulder 154 that applies a compressive force to the outer carrier 130 sufficient to compress the flexible seal 136 between the outer carrier and the bearing housing to prevent contamination entering the seal assembly from that interface.

In the case of shoulder bolts or similar, the shoulder prevents the respective bolt tightening further than the limited length of the thread extending beyond the shoulder.

Consequently, with the flexible seal of desired thickness in place, the bolts can sufficiently tighten to compress the flexible seal and prevent ingress of contamination whilst allowing some lateral movement within the limits of the radial spacing between the shank of each bolt 140 and the inner bore of each respective hole 134.

At least one sealing means 164 plugs a passageway 166 to the cavity 120 to retain oil within the inner seal carrier 114. One or more galleries 162 can be provided from the passageway to feed the cavity 120.

The support 150 can have at least one aperture 168 therethrough to allow for oil flow/pressure between the two seals 116, 118.

The sealing means 164 can include a valve to retain oil pressure within the seal assembly but allow refiling with oil when required.

A space 160 between the inner seal carrier 114 and the bearing housing 128 allows a portion of the inner seal carrier to have the angular freedom to pitch about the centreline of the shaft by a few degrees towards the bearing housing (preferably about +/−5°, more preferably about)+/−3° without hitting the front face 170 of the bearing housing or the flexible seal 136.

The invention claimed is:

1. A seal assembly for a rotatable shaft supported by a bearing in a bearing housing, the seal assembly including an inner seal carrier supporting seals for engagement with the shaft and an outer carrier, the outer carrier supporting the inner seal carrier and having an inner curved surface, the inner seal carrier having an outer curved surface allowing angular positional adjustment of the inner seal carrier within the outer carrier, a flexible seal between the outer carrier and the bearing housing, and the seal assembly including oil within a cavity between the seals;
    wherein the oil is within the cavity at a pressure at or above atmospheric pressure at the location of the seal assembly;
    wherein the oil is at a pressure between about 0.1 bar and about 0.8 bar;
    wherein the inner seal carrier has at least one oil hole for filling oil and/or purging air from the cavity between the seals in the inner seal carrier;
    wherein the at least one oil hole is sealed by at least one corresponding sealing means;
    wherein the at least one sealing means includes a respective valve that retains pressure within the cavity and openable when pressure is applied externally to apply oil into the cavity or replenish oil into the cavity; and
    wherein the outer carrier including holes allowing the seal assembly to be sufficiently fastened by a plurality of bolts to a face of the bearing housing whilst allowing movement of the seal assembly for maintaining alignment with the shaft with the flexible seal maintaining sealing between the outer carrier and the bearing housing.

2. The seal assembly of claim 1, wherein the holes are oversized in bore or diameter with respect to the diameter of each of the plurality of bolts used to fasten the outer carrier to the bearing housing.

3. The seal assembly of claim 2, wherein the plurality of bolts include shoulder bolts providing for sufficient fastening of the seal assembly to seal to the bearing housing via the flexible seal whilst allowing lateral movement of the seal assembly with respect to the bearing housing.

4. The seal assembly of claim 3, including a radial gap having a distance of about 1 mm to about 3 mm between the outer surface of the shaft of one of the plurality of bolts and the internal bore of the respective hole providing for lateral movement of the seal assembly mounting to the bearing housing.

5. The seal assembly of claim 4, the flexible seal having a thickness in a range from about 0.01 mm to about 5 mm.

6. The seal assembly of claim 5, wherein the inner seal carrier including at least one inner seal carrier seal provided around the curved outer surface of the inner seal carrier.

7. The seal assembly of claim 6, wherein the inner seal carrier seal is provided towards an outer face of the inner seal carrier.

8. The seal assembly of claim 7, wherein the inner seal carrier having up to about +/−5° angular freedom with respect to the centre of axis of rotation of the shaft within the outer carrier to accommodate for a lack of parallelism with respect to the shaft.

9. The seal assembly of claim 8, wherein the angular freedom of the inner seal carrier being about +/−4°.

10. The seal assembly of claim 9, wherein including a space between the inner seal carrier and the bearing housing allowing the inner seal carrier to pitch about the centreline of the shaft by up to about +/−5° angular degrees without hitting the front face of the bearing housing or the flexible seal.

11. The seal assembly of claim 10, wherein the angular degrees of pitch are about +/−5°.

12. The seal assembly of claim 11, wherein the inner seal carrier includes a support for the seals and which extends inwardly towards the shaft and between the seals.

13. The seal assembly of claim 12, wherein the support supports the seals when the angular adjustment of the inner seal carrier relative to the outer carrier is at or beyond a threshold.

14. The seal assembly of claim 1, wherein the plurality of bolts include shoulder bolts providing for sufficient fastening of the seal assembly to seal to the bearing housing via the flexible seal whilst allowing lateral movement of the seal assembly with respect to the bearing housing.

15. The seal assembly of claim 14, including a radial gap having a distance of about 1 mm to about 3 mm between the outer surface of the shaft of one of the plurality of bolts and the internal bore of the respective hole providing for lateral movement of the seal assembly mounting to the bearing housing.

16. The seal assembly of claim 1, wherein the flexible seal has a thickness in a range from about 0.01 mm to about 5 mm.

17. The seal assembly of claim 1, wherein the inner seal carrier including at least one inner seal carrier seal provided around the curved outer surface of the inner seal carrier.

18. The seal assembly of claim 1, wherein the inner seal carrier having up to about +/−5° angular freedom with respect to the centre of axis of rotation of the shaft within the outer carrier to accommodate for a lack of parallelism with respect to the shaft.

19. The seal assembly of claim 1, wherein including a space between the inner seal carrier and the bearing housing allowing the inner seal carrier to pitch about the centreline of the shaft by up to about +/−5° angular degrees without hitting the front face of the bearing housing or the flexible seal.

20. The seal assembly of claim 1, wherein the inner seal carrier includes a support for the seals and which extends inwardly towards the shaft and between the seals.

* * * * *